United States Patent Office 2,698,550
Patented Jan. 4, 1955

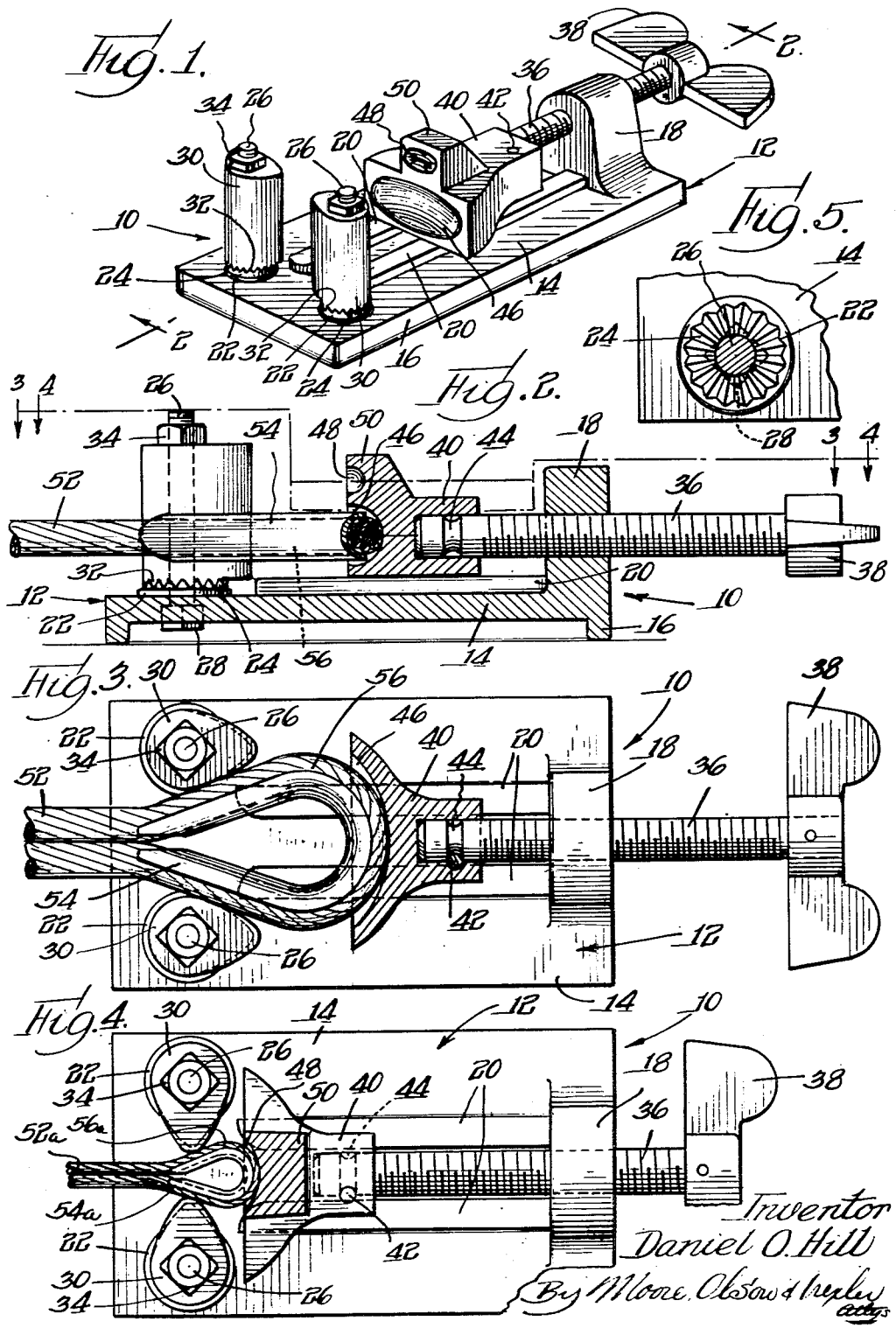

2,698,550

CABLE VISE

Daniel O. Hill, Lake Forest, Ill.

Application June 15, 1951, Serial No. 231,745

10 Claims. (Cl. 81—17.5)

This invention is concerned generally with rope or cable working equipment, and particularly with a cable vise for forming loops or eyes in relatively stiff rope or cable.

In forming rope or cable into loops or eyes, either with or without thimbles in the eyes, great difficulty has been found heretofore in holding the rope or cable in position while clamping, splicing, seizing, soldering or otherwise securing the rope or cable to form a permanent eye. This difficulty has been particularly noticeable with wire rope or cable, but is present with any relatively stiff rope or cable such as of hemp, nylon, or other material.

An object of this invention is to provide a new or improved cable vise for forming loops or eyes in rope or cable.

Another object of this invention is to provide a cable vise of inexpensive yet simple and rugged construction having a minimum number of parts.

A further object of this invention is to provide a cable vise adjustable for operation on ropes or cables of various sizes to form loops or eyes of various sizes.

Other and further objects and advantages of the present invention will be apparent from the following description of a specific embodiment of the invention when taken in connection with the accompanying drawing wherein:

Fig. 1 is a perspective view of my cable vise;

Fig. 2 is a longitudinal sectional view taken along the line 2—2 of Fig. 1;

Fig. 3 is a top view with the clamp shown in section along the line 3—3 of Fig. 2;

Fig. 4 is a view similar to Fig. 3 with the clamp shown in section along the line 4—4 of Fig. 2; and Fig. 5 is a fragmentary view showing one of the serrated bases for locking the throat pieces in adjusted position.

Referring now to the drawing in greater particularity, a cable vise 10 embodying the principles of my invention may be seen to comprise a cast base 12 of metal such as iron. The base includes a flat table or platform 14 of rectangular configuration having a depending supporting flange 16 about its periphery. The base further includes an integral upright boss 18 and a pair of parallel, spaced apart ways 20. The base is completed by a pair of spaced apart raised portions 22 having radially disposed V-shaped teeth 24 on the upper surfaces thereof. The raised portions 22 are provided with apertures through which bolts 26 are passed, the bolt heads 28 fitting in complementary recesses in the bottom of the table or platform 14 to preclude rotation of the bolts. The bolts may be secured against axial movement by a press fit in their respective apertures or by any other suitable or desirable means.

Two throat pieces 30 of substantially tear drop cross section and of substantial vertical height are mounted on the bolts 26 and are provided with radially disposed V-shaped teeth 32 on their lower surfaces complementary with the V-shaped teeth 24 on the raised portions of the base. The throat pieces 30 are rotatably adjustable about the bolts 26 and are locked in adjusted position by the complementary V-shaped teeth 24 and 32 by tightening nuts 34 on the bolts against the tops of the throat pieces. Although not shown as such, these nuts can be wing nuts if desired. The throat pieces 30 are tapered vertically, being wider at the top than at the bottom in order to define a tapered throat between them with the narrow edge of the throat at the top. The tapered throat prevents a rope or cable from popping out of the throat as will be more apparent hereinafter.

An adjusting screw 36 is threaded through the upstanding boss 18 of the base and a handle 38 is pinned or otherwise fixed on the outer end of the screw. The inner end of the screw is rotatably received in a clamping jaw 40 and is held against axial movement therein by a pin 42 passing vertically through the jaw and through a peripheral groove 44 in the adjusting screw 36 near the end thereof. The jaw 40 is adapted to slide along the top of the ways 20 and may be provided with a depending guide portion fitting between the ways, although this portion generally will be found to be unnecessary. An arcuate aperture 46 of relatively wide radius is provided in the forward face of the jaw 40 substantially in line with the screw 36. A similar aperture 48 of considerably smaller radius is provided in vertical alignment with the aperture 46 in the raised portion 50 of the jaw 40.

In order to form an eye or loop in a relatively stiff rope or cable of fairly large diameter, the throat pieces 30 are locked in the position shown in Figs. 2 and 3 with the larger axes of the tear drop cross sections substantially parallel to define a relatively wide throat. The rope or cable to be formed into a loop or eye is illustrated as a wire rope or cable, but it will be understood that the invention has equal applicability to relatively stiff ropes or cables of any material. Therefore, when either of the terms "rope" or "cable" is used hereinafter, it is to be understood as used in its generic sense including any material of which ropes or cables commonly are formed.

The rope 52 is formed into an eyelet about a thimble 54 as shown in Figs. 2 and 3 and is clamped against the throat pieces 30 by the jaw 40 with the rope received in the relatively wide recess 46 and the adjacent sections of rope extending through the throat between the throat pieces 30. It will be understood that the eyelet 56 in the rope is formed partially by hand and is completed by clamping the partial eyelet between the jaw 40 and throat pieces 30. It further will be understood that the thimble 54 can be omitted if only a loop or eye of rope is desired. The eyelet 56 is held firmly in place while the adjacent sections of rope are secured together by any known means such as cable clamps, splicing and whipping or soldering. The eye cannot move upwards due to the tapered throat defined by the throat pieces and therefore cannot come loose from its clamped position.

In order to form loops or eyelets of smaller diameter in rope or cable of smaller size, the nuts 34 are loosened and the throat pieces 30 are rotated into the position shown in Fig. 4 with their major axes coinciding. The throat thus defined is considerably narrower and a small rope 52a thus readily is clamped about a thimble 54a with the rope eyelet 56a received in the smaller recess 48 of the jaw 40. It will be understood that the thimble 54a can be omitted if desired.

It is apparent that the throat pieces 30 can be adjusted to any position between or beyond the positions shown in Figs. 3 and 4 in order to define throats of different sizes for forming loops of different sizes and for use with ropes of different sizes.

The cable clamp disclosed herein is readily and quickly utilized to clamp rope or cable eyelets in position, either with or without thimbles in the eyelets, and to hold the rope positively while the eyelet is made permanent by means of cable clamps, whipping, or any other known expedient. The work can be performed with unusual ease and speed and with a high quality of workmanship. Any number of recesses can be provided in the jaw 40 and replaceable throat pieces can be utilized if desired in order to make my cable vise adjustable over an even wider range of sizes than shown and described in the illustrative embodiment.

Other structural changes within the scope of the invention will occur to those skilled in the art and I hereby expressly reserve the right to all such changes as may fall within the spirit and scope of the claims appended hereinafter.

I claim:

1. A cable vise for use in forming eyes in ropes or cables, including a base, a pair of elongated, spaced apart abutment members upstanding from said base and engageable with the narrow end of a rope eye, a jaw on said base, said jaw having a plurality of arcuate concavities of different sizes spaced above one another and selectively engageable with the arcuate ends of rope eyes of different sizes, the uppermost of said concavities being no higher than said abutment members and means for shifting said jaw and said pair of spaced apart abutment members relatively toward one another to clamp a rope eye therebetween, the jaw being unenclosed to afford lateral finger spaces between said jaw and said abutment members.

2. A cable vise for use in forming eyes in ropes or cables, including a base, a pair of spaced apart abutment members engageable with the narrow end of a rope eye, fixed members on said base for supporting said abutment members, means for adjusting said abutment members on said fixed members to vary the spacing between said abutment members to accommodate ropes and eyes of different sizes, a jaw on said base, said jaw having a portion engageable with the arcuate end of a rope eye, and means for shifting said jaw and said pair of spaced apart abutment members relatively toward one another to clamp a rope eye therebetween.

3. A cable vise for use in forming eyes in ropes or cables, including a base, a pair of non-circular abutment members, fixed members on said base supporting said abutment members, means for rotatably mounting said abutment members on said fixed members in spaced apart relation and engageable with the narrow end of a rope eye, the spacing between said abutment members being adjustable by rotation thereof to accommodate different sizes of ropes and eyes, a jaw on said base, said jaw having a portion engageable with the arcuate end of a rope eye, and means for shifting said jaw and said pair of spaced apart abutment members relatively toward one another to clamp a rope eye therebetween.

4. A cable vise for use in forming eyes in ropes or cables, including a base, a pair of upstanding abutment members of substantially tear drop cross section, means for rotatably mounting said abutment members in spaced apart relation on said base for engaging the narrow end of a rope eye, the spacing between said members being adjustable by rotation thereof to accommodate ropes and eyes of different sizes, means for locking said abutment members in adjusted position, a jaw on said base, said jaw having a portion engageable with the arcuate end of a rope eye, and means for shifting said jaw and said pair of spaced apart adjustment members relatively toward one another to clamp a rope eye therebetween.

5. A cable vise for use in forming eyes in ropes or cables, including a base, a pair of spaced apart abutment members engageable with the narrow end of a rope eye, means for adjusting the spacing between said members by rotation thereof to accommodate ropes and eyes of different sizes, means for locking said abutment members in adjusted position, said abutment members being tapered to define a space between them narrower at the top than at the bottom to prevent a rope eye from springing upwardly therefrom, a jaw on said base, said jaw having a portion engageable with the arcuate end of a rope eye, and means for shifting said jaw and said pair of spaced apart abutment members relatively toward one another to clamp a rope eye therebetween.

6. A cable vise for use in forming eyes in ropes or cables, including a base, an upstanding boss on said base, a pair of elongated abutment members of substantially tear drop cross section, means for rotatably mounting said abutment members in upstanding, spaced apart position opposite said boss, said abutment members being tapered to define a space between them narrower at the top than at the bottom for engaging and retaining the narrow end of a rope eye, the space between said members being adjustable by rotation of said members to accommodate ropes and eyes of different sizes, a screw member passing through said boss, a jaw on said screw member confronting said abutment members, said jaw having a plurality of concavities selectively engageable with different sized rope eyes, and a handle on said screw member for rotating said screw member to shift said jaw toward said pair of abutment members to clamp a rope between said jaw and said abutment members.

7. A cable vise for use in forming eyes in ropes or cables, including a base, a pair of spaced apart abutment members having peripheral surfaces for clampingly engaging the narrow end of a rope eye, means for rotatably mounting said abutment members in spaced apart relation, the axes of rotation of said members being substantially parallel in fixed spaced relation and substantially perpendicular to said base, the spacing between the peripheral surfaces of said members being adjustable by rotation thereof to accommodate ropes and eyes of various sizes, a jaw on said base, said jaw having a portion engagable with the arcuate end of a rope eye, and means for shifting said jaw and said pair of spaced apart adjustment members relatively toward on another to clamp a rope eye therebetween.

8. A cable vise as set forth in claim 7 wherein said abutment members are tapered to define a space between them narrower at the top than at the bottom to prevent a rope eye from springing upwardly therefrom.

9. A cable vise as set forth in claim 7 wherein means are provided for locking said abutment members in adjusted position.

10. A cable vise for use in ropes or cables, including a base, a pair of spaced apart rotatable abutment members having peripheral clamping surfaces engageable with the narrow end of a rope eye, the clamping surface of each abutment member being eccentrically disposed with respect to its axis of rotation whereby adjustment of the space between said surfaces may be accomplished by rotation thereof to accommodate ropes and eyes of different sizes, means for locking said abutment members in adjusted position, a jaw on said base, said jaw having a portion engageable with the arcuate end of a rope eye, and means for shifting said jaw and said pair of spaced apart abutment members relatively toward one another to clamp a rope eye therebetween.

References Cited in the file of this patent

UNITED STATES PATENTS

| Number | Name | Date |
|---|---|---|
| 153,551 | Evans | July 28, 1874 |
| 1,779,053 | Stoner | Oct. 21, 1930 |
| 2,471,269 | Gaulke | May 24, 1949 |